United States Patent
Ramasubramaniam et al.

(10) Patent No.: US 9,715,435 B2
(45) Date of Patent: *Jul. 25, 2017

(54) INTERCONNECT PATH FAILOVER

(71) Applicant: NetApp Inc., Sunnyvale, CA (US)

(72) Inventors: Vaiapuri Ramasubramaniam, Bangalore (IN); Rishabh Mittal, New Delhi (IN); Amarnath Jolad, Bangalore (IN); Hrishikesh Keremane, Sunnyvale, CA (US); Harihara Kadayam, Fremont, CA (US)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,971

(22) Filed: May 26, 2016

(65) Prior Publication Data

US 2016/0266989 A1 Sep. 15, 2016

Related U.S. Application Data

(63) Continuation of application No. 14/261,556, filed on Apr. 25, 2014, now Pat. No. 9,354,992.

(51) Int. Cl.
*G06F 11/00* (2006.01)
*G06F 11/20* (2006.01)
(Continued)

(52) U.S. Cl.
CPC ........ *G06F 11/2069* (2013.01); *G06F 11/201* (2013.01); *G06F 11/2005* (2013.01);
(Continued)

(58) Field of Classification Search
USPC ....................................................... 714/4.5
See application file for complete search history.

(56) References Cited

U.S. PATENT DOCUMENTS 6,112,311 A * 8/2000 Beardsley ........... G06F 11/2005
  710/8
7,272,674 B1* 9/2007 Nandi ................. H04L 67/1097
  370/216
(Continued)

OTHER PUBLICATIONS

Non-Final Office Action cited in U.S. Appl. No. 14/261,556 dated Nov. 6, 2015, 14 pgs.
(Continued)

*Primary Examiner* — Amine Riad
(74) *Attorney, Agent, or Firm* — Cooper Legal Group, LLC (57) ABSTRACT

One or more techniques and/or systems are provided for interconnect failover between a primary storage controller and a secondary storage controller. The secondary storage controller may be configured as a backup or failover storage controller for the primary storage controller in the event the primary storage controller fails. Data and/or metadata describing the data (e.g., data and/or metadata stored within a write cache) may be mirrored from the primary storage controller to the secondary storage controller over one or more interconnect paths. Responsive to identifying a failover trigger for a failed interconnect path, the secondary storage controller is instructed to fence (e.g., block) I/O operations from the failed interconnect path. Streams of data and/or metadata that were affected by the failure may be instructed to transmit such data and/or metadata over one or more non-failed interconnect paths to the secondary storage controller during failover of the failed interconnect path.

20 Claims, 10 Drawing Sheets

(51) Int. Cl.
*G06F 11/22* (2006.01)
*G06F 11/30* (2006.01)
*G06F 12/02* (2006.01)

(52) U.S. Cl.
CPC ........ *G06F 11/2092* (2013.01); *G06F 11/221* (2013.01); *G06F 11/2221* (2013.01); *G06F 11/3027* (2013.01); *G06F 11/3051* (2013.01); *G06F 12/0238* (2013.01); *G06F 2212/222* (2013.01)

(56) References Cited

U.S. PATENT DOCUMENTS

| | | | | |
|---|---|---|---|---|
| 7,516,285 B1* | 4/2009 | Haynes | ............ | G06F 17/30197 711/162 |
| 7,590,737 B1* | 9/2009 | Chen | ............ | G06F 11/004 709/223 |
| 7,613,947 B1* | 11/2009 | Coatney | ............ | G06F 11/0727 714/6.1 |
| 7,685,462 B1* | 3/2010 | Leong | ............ | G06F 11/2087 714/6.12 |
| 7,886,182 B1* | 2/2011 | Coatney | ............ | G06F 11/2028 714/11 |
| 8,699,322 B1* | 4/2014 | Tawri | ............ | G06F 11/2005 370/216 |
| 2002/0188711 A1* | 12/2002 | Meyer | ............ | G06F 3/0605 709/223 |
| 2006/0117227 A1* | 6/2006 | Hsu | ............ | G06F 11/0712 714/44 |
| 2007/0022138 A1* | 1/2007 | Erasani | ............ | G06F 11/0709 |
| 2007/0022314 A1* | 1/2007 | Erasani | ............ | G06F 11/1425 714/4.1 |
| 2007/0294563 A1* | 12/2007 | Bose | ............ | G06F 11/2092 714/5.11 |
| 2010/0180153 A1* | 7/2010 | Jernigan, IV | ............ | G06F 11/1076 714/6.12 |
| 2014/0173338 A1* | 6/2014 | Arroyo | ............ | G06F 11/1412 714/15 |
| 2014/0297611 A1* | 10/2014 | Abbour | ............ | G06F 17/30442 707/703 |
| 2015/0309892 A1* | 10/2015 | Ramasubramaniam | ............ | G06F 11/2005 714/4.5 |

OTHER PUBLICATIONS

Reply Non-Final Office Action cited in U.S. Appl. No. 14/261,556 dated Jan. 12, 2016, 12 pgs.
Notice of Allowance cited in U.S. Appl. No. 14/261,556 dated Mar. 28, 2016, 22 pgs.

* cited by examiner

FIG. 10 ium of US 9,715,435 B2

INTERCONNECT PATH FAILOVER

RELATED APPLICATION

This application claims priority to and is a continuation of U.S. patent application Ser. No. 14/261,556, filed on Apr. 25, 2014 and titled "INTERCONNECT PATH FAILOVER," which is incorporated herein by reference.

BACKGROUND

A network storage environment may comprise one or more storage controllers configured to provide client devices with access to data stored on storage devices accessible via the respective storage controllers. In particular, a client device may connect to a primary storage controller that may provide the client device with I/O access to a storage device accessible to and/or managed by the primary storage controller. In an example, the primary storage controller and a secondary storage controller may be configured according to a high availability configuration where the secondary storage controller is available to take over for the primary storage controller in the event a failure occurs with respect to the primary storage controller. The secondary storage controller may be provided with access to storage devices managed by the primary storage controller. Because the primary storage controller may utilize local primary memory as a cache (e.g., NVram used as a write cache) for expediting client I/O requests without accessing relatively slower storage devices, a synchronization technique, such as a mirroring technique, may be performed between the local primary memory of the primary storage controller and local secondary memory of the secondary storage controller.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for interconnect failover between a primary storage controller and a secondary storage controller are provided. For example, a first interconnect path, a second interconnect path, and/or other interconnect paths may connect the primary storage controller to the secondary storage controller. A synchronization technique may mirror data and/or metadata, such as utilizing remote direct memory access (RDMA), from a local primary cache, such as a primary NVram, of the primary storage controller to a local secondary cache, such as a secondary NVram, of the secondary storage controller (e.g., so that the secondary storage controller has up-to-date data and/or metadata used by the primary storage controller as a cache, such as a write cache). A failover trigger associated with the first interconnect path may be identified (e.g., a failure of the first interconnect path). A fence instruction may be sent to the secondary storage controller. The fence instruction may instruct the secondary storage controller to fence (e.g., block or ignore) I/O operations from the first interconnect path. Responsive to receiving a fence acknowledgment message from the secondary storage controller, interconnect failover is performed for the first interconnect path utilizing the second interconnect path to transmit storage information from the primary storage controller to the secondary storage controller. The storage information may comprise in-flight I/O operations of one or more streams (e.g., a logical organization of data and/or metadata) that were utilizing the first interconnect path. In an example, the storage information does not comprise I/O operations of streams that were not utilizing the first interconnect path (e.g., unaffected streams may continue normal operation). In this way, interconnect failover is seamlessly performed without involving clients and/or without performing an entire resynchronization between the primary storage controller and the secondary storage controller (e.g., merely in-flight I/O operations and/or I/O operations of streams that were utilizing the first interconnection path are transmitted through the second interconnect path, while other streams are allowed to continue operation during the interconnect failover).

Figure 1:
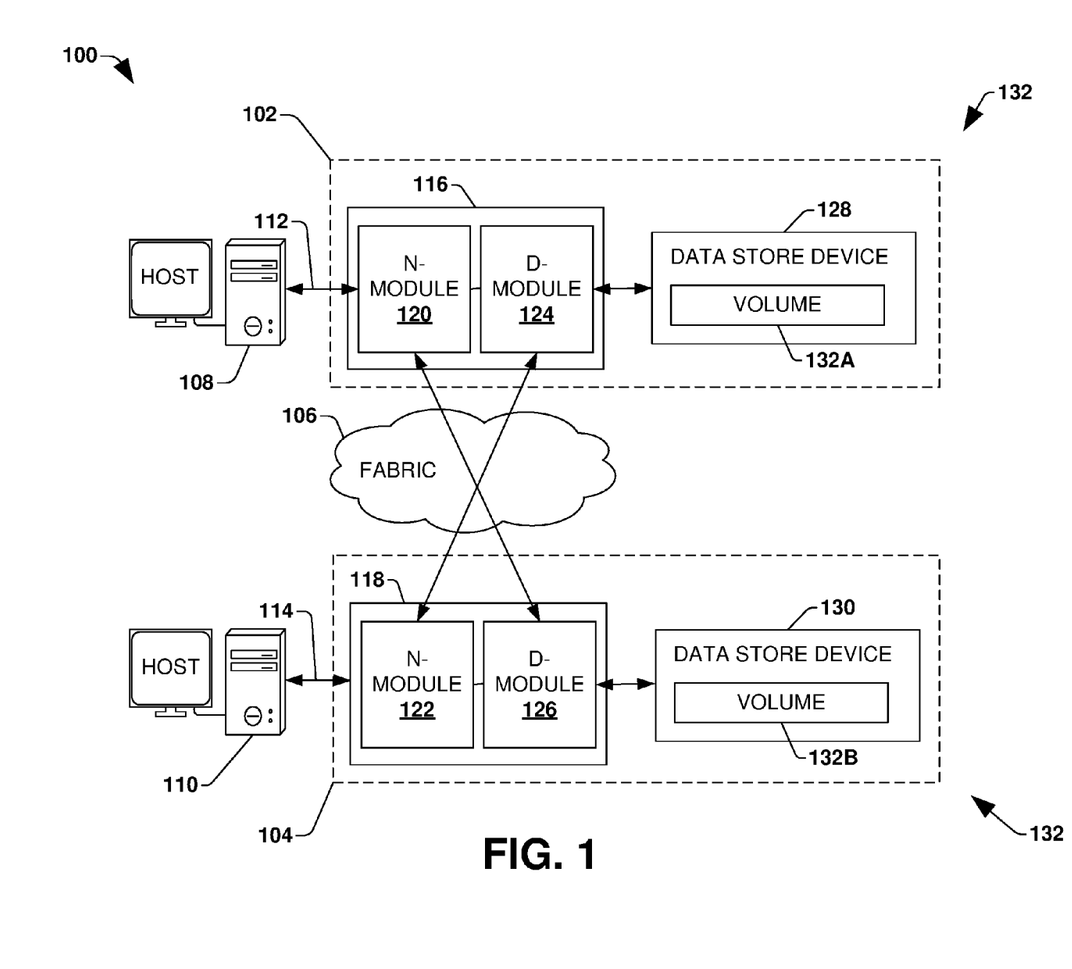
FIG. 1 is a component block diagram illustrating an example clustered network in accordance with one or more of the provisions set forth herein.

To provide context for interconnection failover between a primary storage controller and a secondary storage controller, FIG. 1 illustrates an embodiment of a clustered network environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary storage controller and node 118 may comprise a secondary storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the N-module 120 in the node 116 within data storage system 102. The node 116 can forward the data to the data storage device 128 using the D-module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that interconnect failover may be implemented within the clustered network environment 100. For example, the node 116 may comprise a primary storage controller and the node 118 may comprise a secondary storage controller. An interconnect failover module may be implemented between the node 116 and the node 118. The interconnect failover module may be configured to perform interconnect failover of an interconnect path between the node 116 and the node 118 (e.g., an interconnect path through the fabric 106). The interconnect failover module may be implemented within the fabric 106, on the host 108, on the host 110, on the node 116, on the node 118, or between the node 116 and the node 118.

Figure 2:
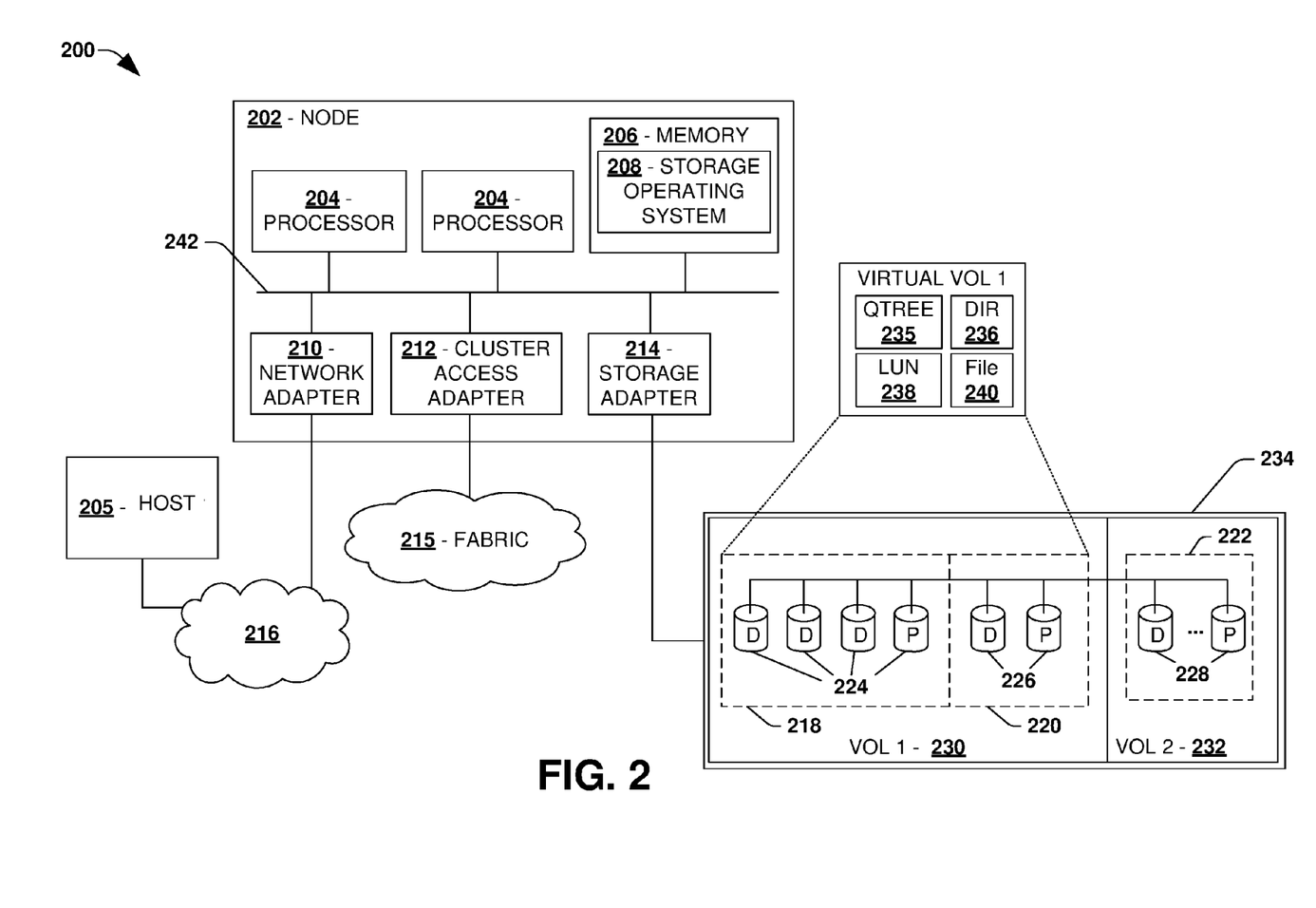
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that interconnect failover may be implemented for the data storage system 200. For example, the node 202 may comprise a primary storage controller that stores data within the data storage device 234. A secondary storage controller, not illustrated, may function as a backup storage controller for the node 202. An interconnect failover module may be implemented between the node 202 and the secondary storage controller. The interconnect failover module may be configured to perform interconnect failover of an interconnect path between the node 202 and the secondary storage controller (e.g., an interconnect path through the cluster fabric 215). The interconnect failover module may be implemented within the cluster fabric 215, on the node 202, on the host 205, on the secondary storage controller, or between the node 202 and the secondary storage controller.

Figure 3:
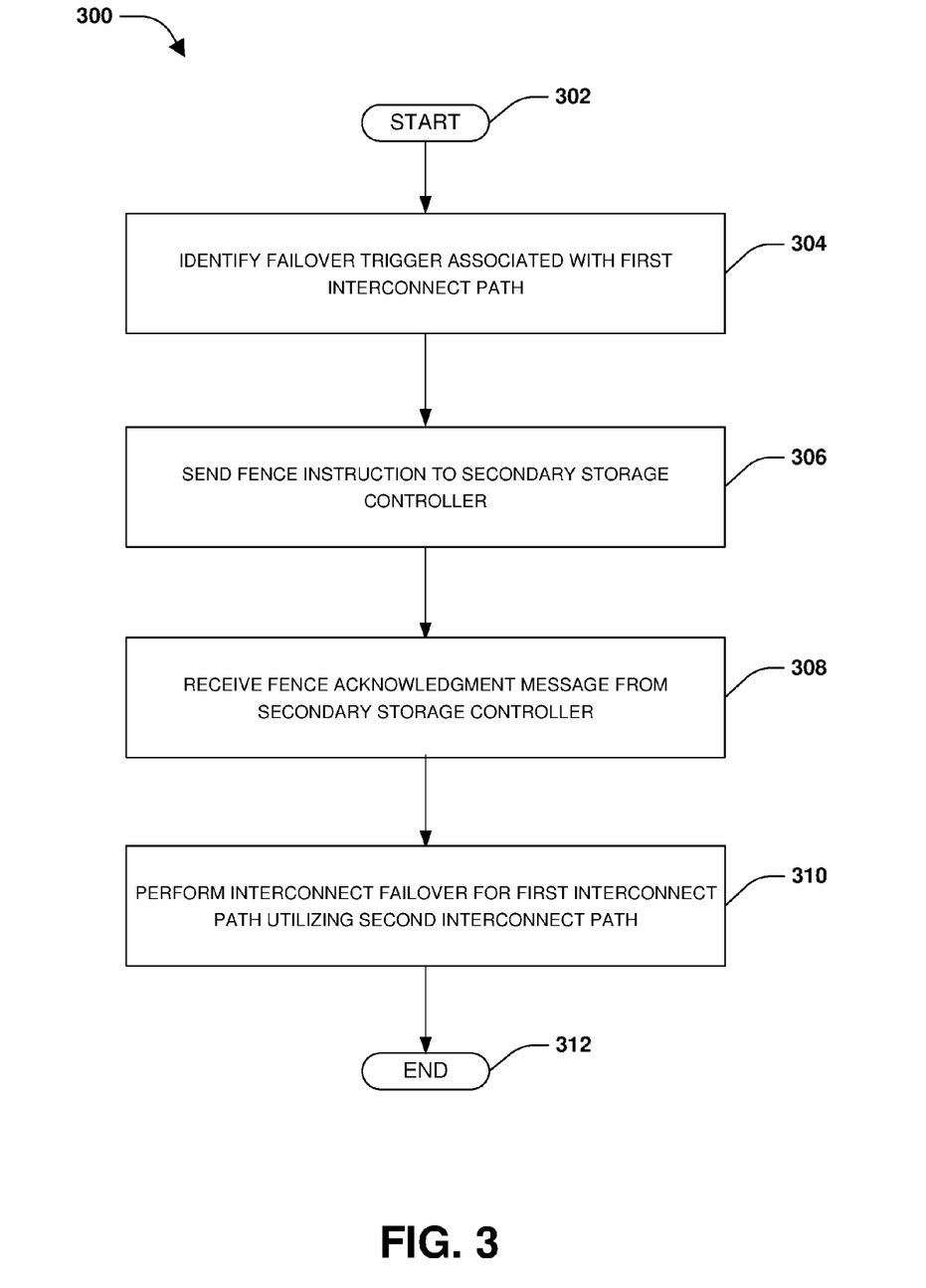
FIG. 3 is a flow chart illustrating an exemplary method of interconnect failover between a primary storage controller and a secondary storage controller.

One embodiment of interconnect failover between a primary storage controller and a secondary storage controller is illustrated by an exemplary method 300 of FIG. 3. At 302, the method starts. The primary storage controller may provide client devices with I/O access to data stored within one or more storage devices. To improve access response times for the client devices, the primary storage controller may maintain a primary NVram (e.g., memory) used as a cache, such as a write cache. The primary storage controller may expedite I/O requests by clients utilizing data and/or metadata stored within the primary NVram, as opposed accessing a storage devices having a relatively higher access latency than the primary NVram. The secondary storage controller may be configured as a backup or failover storage controller for the primary storage controller. The secondary storage controller may have access to the storage devices used by the primary storage controller. A synchronization technique, such as mirroring, may be used to synchronize a secondary NVram of the secondary storage controller with the primary NVram so that the secondary storage controller has access to up-to-date mirrored copies of data and/or metadata cached by the primary storage controller within the primary NVram. Such mirroring may be performed over one or more interconnect paths between the primary storage controller and the secondary storage controller. In an example, the interconnect paths correspond to remote direct memory access (RDMA) streams/operations.

At 304, a failover trigger associated with a first interconnect path between the primary storage controller and the secondary storage controller is identified. In an example, a failover trigger notification may be received from a communication layer (e.g., a lower level layer compared to a failover layer that provides interconnect failover). In another example, responsive to a polling interval expiring (e.g., between about 400 ms to about 600 ms), the secondary storage controller may be polled to determine whether an I/O operation has completed. If the I/O operation has not completed within a timeout threshold (e.g., due to failure of the first interconnect path), then the failover trigger may be identified. A failover trigger generally indicates a deficiency with the first interconnect path.

At 306, a fence instruction may be sent to the secondary storage controller. The fence instruction may instruct the secondary storage controller to fence (e.g., block or ignore) I/O operations from the first interconnect path. At 308, a fence acknowledgment message may be received from the secondary storage controller. The fence acknowledgment message may indicate that the secondary storage controller will not accept I/O operations from the first interconnect path during interconnect failover for the first interconnect path. In an example, I/O operations for transmission across the first interconnect path may be queued for later transmission and/or queued for transmission across a different interconnect path during interconnect failover for the first interconnect path.

At 310, interconnect failover is performed for the first interconnect path utilizing a second interconnect path to transmit storage information from the primary storage controller to the secondary storage controller. The storage information comprises data stored by the primary storage controller (e.g., stored within or to be stored within the primary NVram) and/or metadata describing the data (e.g., describing an NVlog for the primary NVram, such as information as to whether an I/O operation successfully completed, how to interpret information within the NVlog, what data is available, what data is pending, what data has been committed to storage, etc.).

In an example, data that is to be mirrored from the primary NVram to the secondary NVram may be logically partitioned or grouped into unitary logical units, such as streams. A stream may correspond to data and/or metadata that may be treated as a single logical unit (e.g., a stream operation may be declared as completed so long as all data and/or metadata of the stream is completely processed; completion of the stream operation does not depend upon other streams; etc.). A first stream, corresponding to a first logical unit of the storage information, may be identified based upon the first stream corresponding to first in-flight I/O associated with the first interconnect path (e.g., an I/O operation transmitted over the first interconnect path). Because the first stream may be affected by the failover of the first interconnect path, the first stream may be transmitted to the secondary storage controller over the second interconnect path. For example, a data transmission of data, associated with the first stream, may be facilitated over the second interconnect path. In an example, a complete set of data associated with the first stream may be identified. A single transmission of the complete set of data may be transmitted as the data transmission. Responsive to completion of the data transmission, a metadata transmission of metadata may be facilitated over the second interconnect path. The data may be transmitted before the metadata because the metadata may describe the data (e.g., if metadata, indicating that data (c) is available, is received before data (c) is received, then an error may occur). In this way, one or more streams, such as a second stream having second in-flight I/O associated with the first interconnect path, may be transmitted over the second interconnect path. One or more unaffected streams, such as streams not corresponding to in-flight I/O associated with the interconnect path, may continue operation during the interconnect failover.

Figure 4:
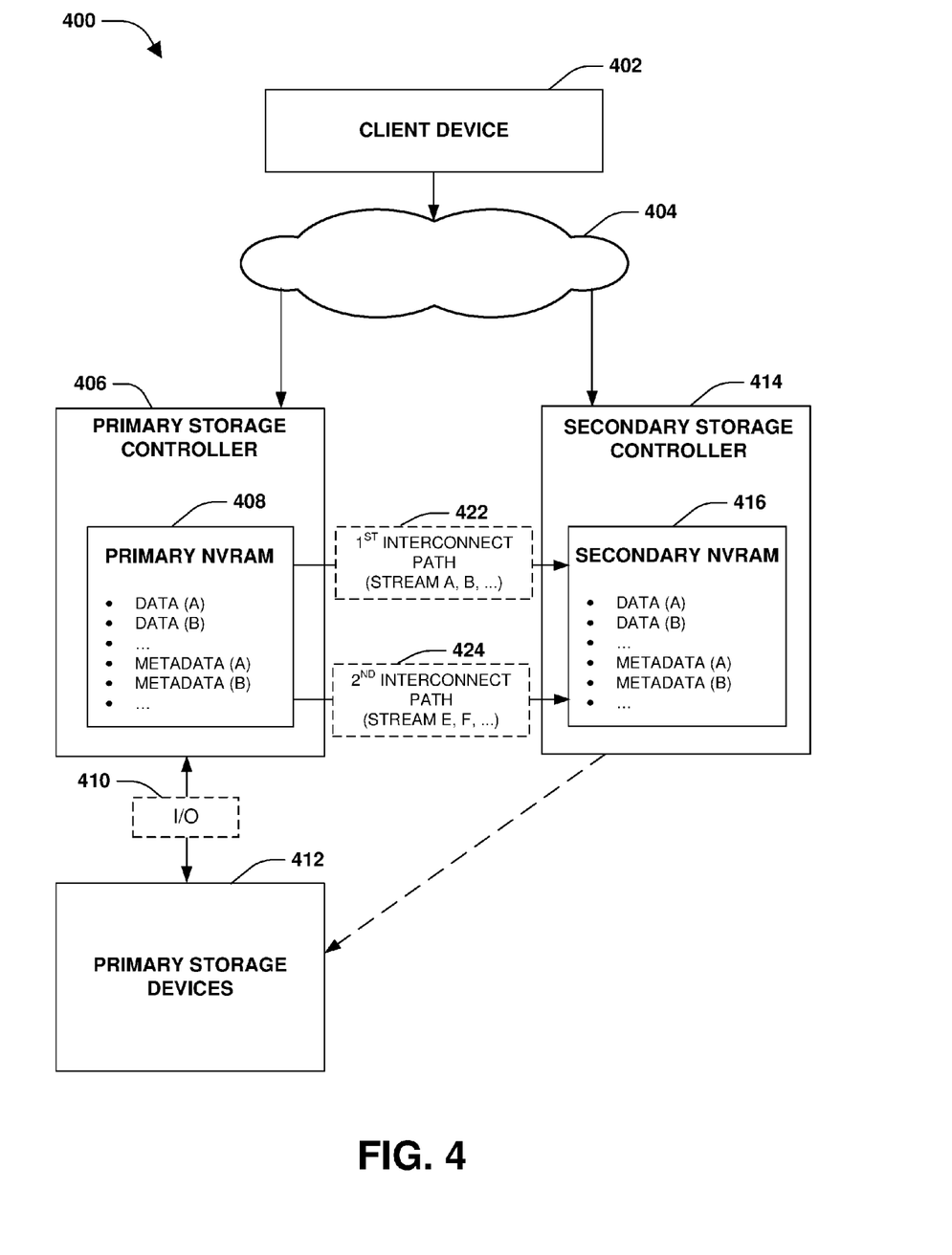
FIG. 4 is an example of a primary storage controller and a secondary storage controller.

FIG. 4 illustrates an example 400 of a primary storage controller 406 and a secondary storage controller 414. A client device 402 may connect to the primary storage controller 414 and/or the secondary storage controller 414 through a network 404. The primary storage controller 406 may be configured to provide the client device 402 with I/O access 410 to primary storage devices 412 managed by the primary storage controller 406. In an example, the secondary storage controller 414 may be configured as a failover storage controller for the primary storage controller 406 in the event the primary storage controller 406 fails. The secondary storage controller 414 may have access to the primary storage devices 412. Because the primary storage controller 406 may utilize a primary NVram 408 as a cache, such as a write cache, to store data and/or metadata describing the data, a synchronization techniques (e.g., a mirroring technique) may mirror the data and/or metadata from the primary NVram 408 to a secondary NVram 416 of the secondary storage controller 414. Data and/or metadata may be partitioned or grouped into streams corresponding to logical units of storage information. For example, a stream (A), a stream (B), and/or other streams may send I/O (e.g., data and/or metadata for mirroring between the primary NVram 408 and the secondary NVram 416) over the first interconnect path 422 to the secondary NVram 416. A stream (E), a stream (F), and/or other streams may send I/O (e.g., data and/or metadata for mirroring between the primary NVram 408 and the secondary NVram 416) over the second interconnect path 424 to the secondary NVram 416. It may be appreciated that other interconnect paths may be formed between the primary storage controller 406 and the secondary storage controller 414.

Figure 5:
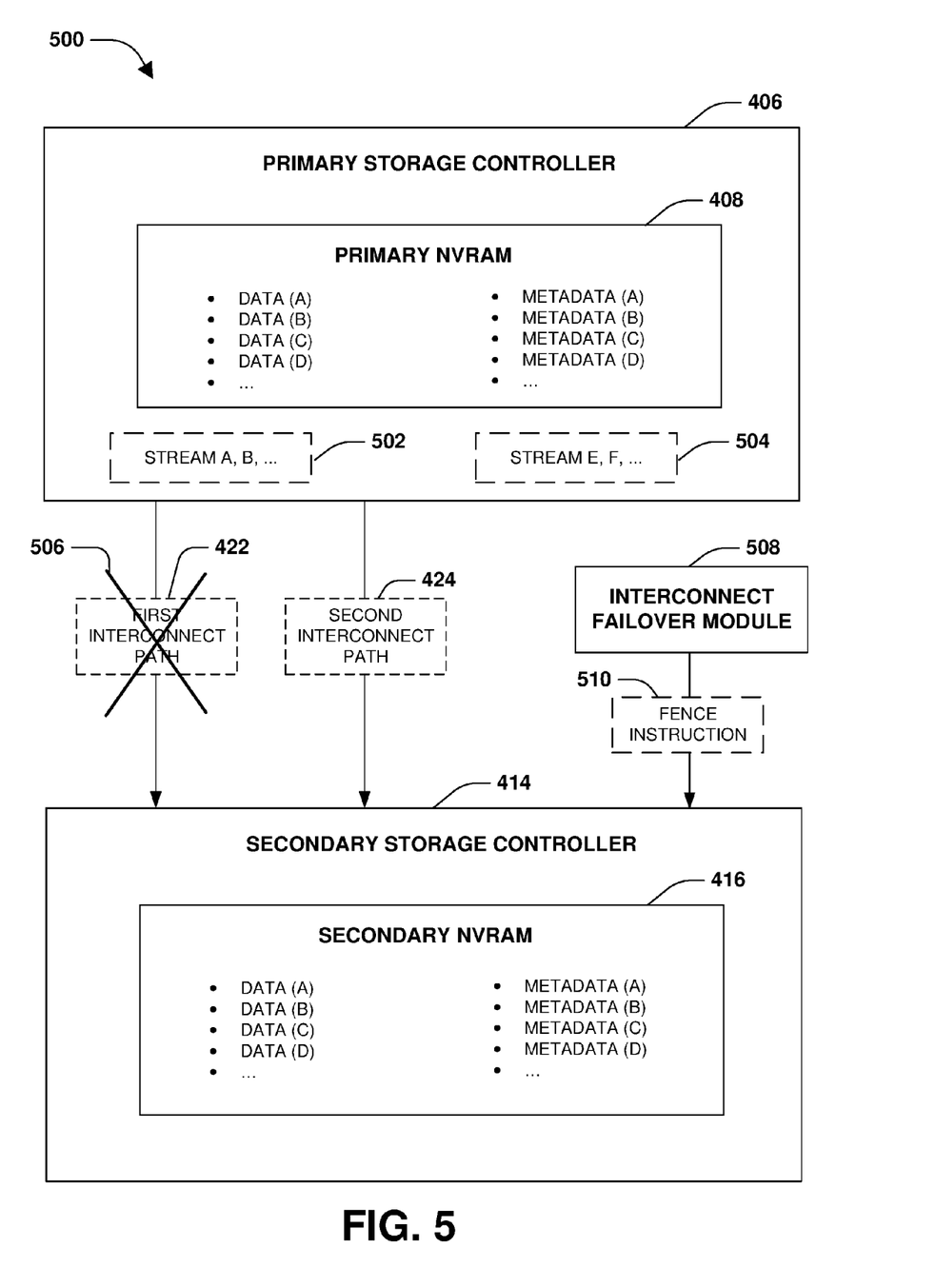
FIG. 5 is a component block diagram illustrating an exemplary system for interconnect failover between a primary storage controller and a secondary storage controller.

FIG. 5 illustrates an example of a system 500 for interconnect failover between the primary storage controller 406 and the secondary storage controller 414 (e.g., illustrated in FIG. 4). The system 500 may comprise an interconnect failover module 508. A mirroring technique may maintain a first set of streams 502, such as the stream (A) and the stream (B), that may utilize the first interconnect path 422 to transmit I/O, associated with data and/or metadata stored within the primary NVram 408, to the secondary NVram 416. The mirroring technique may maintain a second set of streams 504, such as the stream (E) and the stream (F), that may utilize the second interconnect path 424 to transmit I/O, associated with data and/or metadata stored within the primary NVram 408, to the secondary NVram 416. The interconnect failover module 508 may detect a failover trigger 506 associated with the first interconnect path 422 (e.g., a failure, timeout, or other issue associated with the first interconnect path 422). Accordingly, the interconnect failover module 508 may send a fence instruction 510 to the secondary storage controller 414. The fence instruction 510 may instruct the secondary storage controller 414 to fence (e.g., block) I/O operations from the first interconnect path 422.

Figure 6:
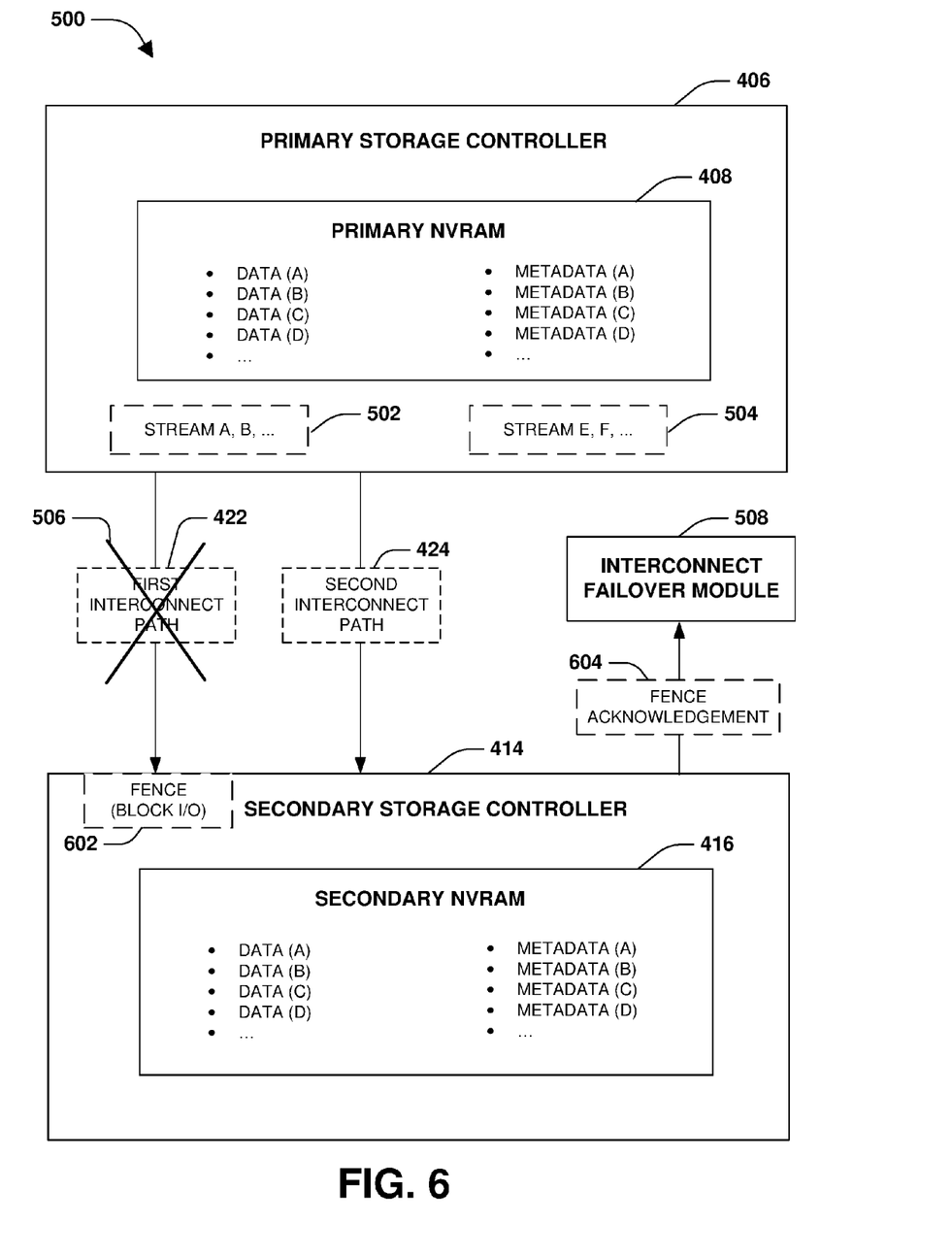
FIG. 6 is an example of an interconnect failover module receiving a fence acknowledgement.

The interconnect failover module 508 may receive a fence acknowledgement message 604 from the secondary storage controller 414, as illustrated in FIG. 6. The fence acknowledgement message 604 may indicate that the secondary storage controller 414 will not accept I/O operations from the first interconnect path 422 during interconnect failover for the first interconnect path 422. For example, the secondary storage controller 414 may have fenced 602 the first interconnect path 422 to block I/O operations from the first interconnection path 422.

Figure 7:
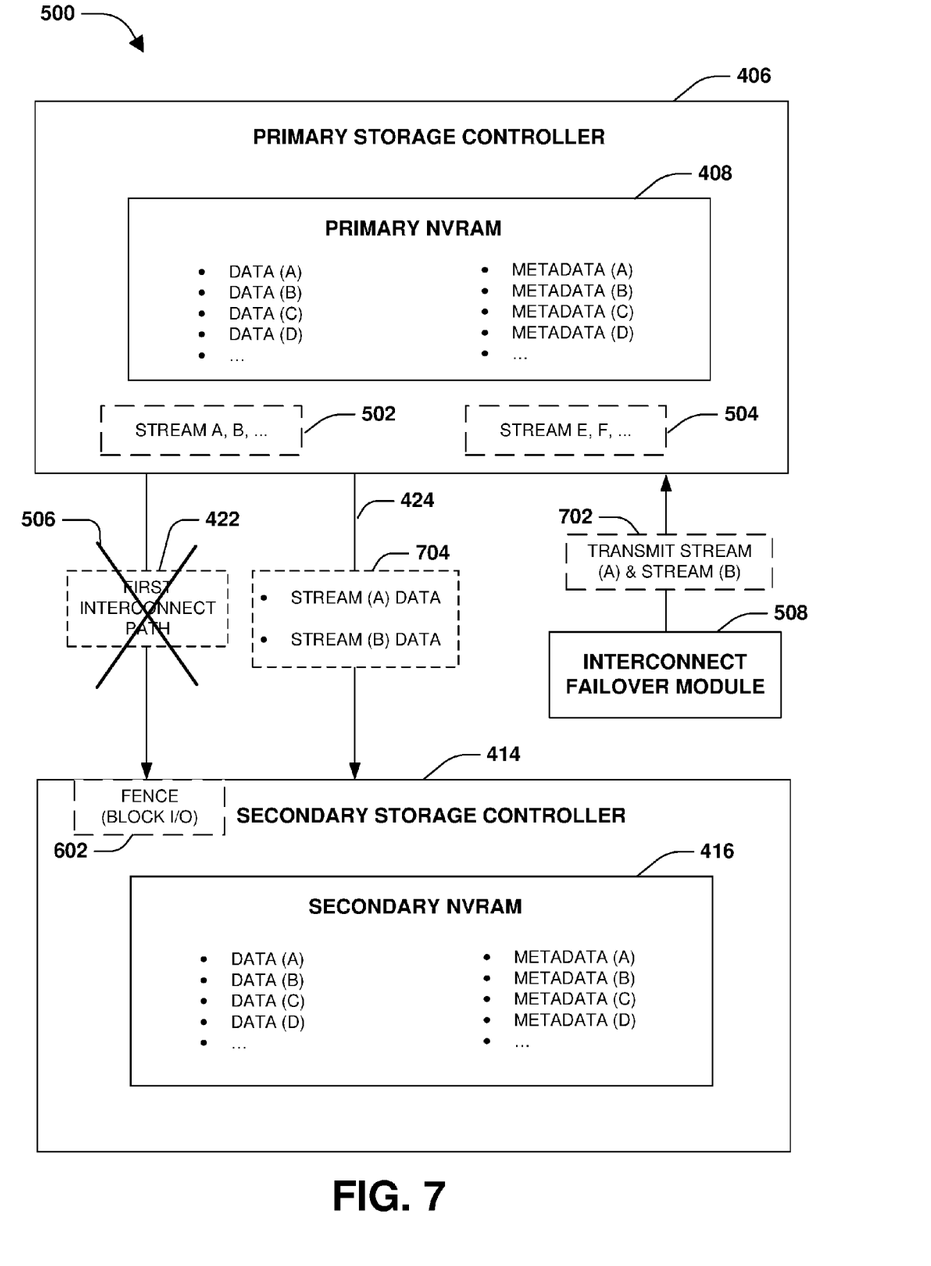
FIG. 7 is an example of an interconnect failover module facilitating transmission of data associated with one or more streams affected by a failover of an interconnect path.

The interconnect failover module 508 may be configured to identify one or more streams that may have been affected by the failure of the first interconnect path 422, as illustrated in FIG. 7. For example, the interconnect failover module 508 may determine that the stream (A), the stream (B), and/or other streams within the first set of steams 502 may have had in-flight I/O associated with the first interconnect path 422.

Figure 8:
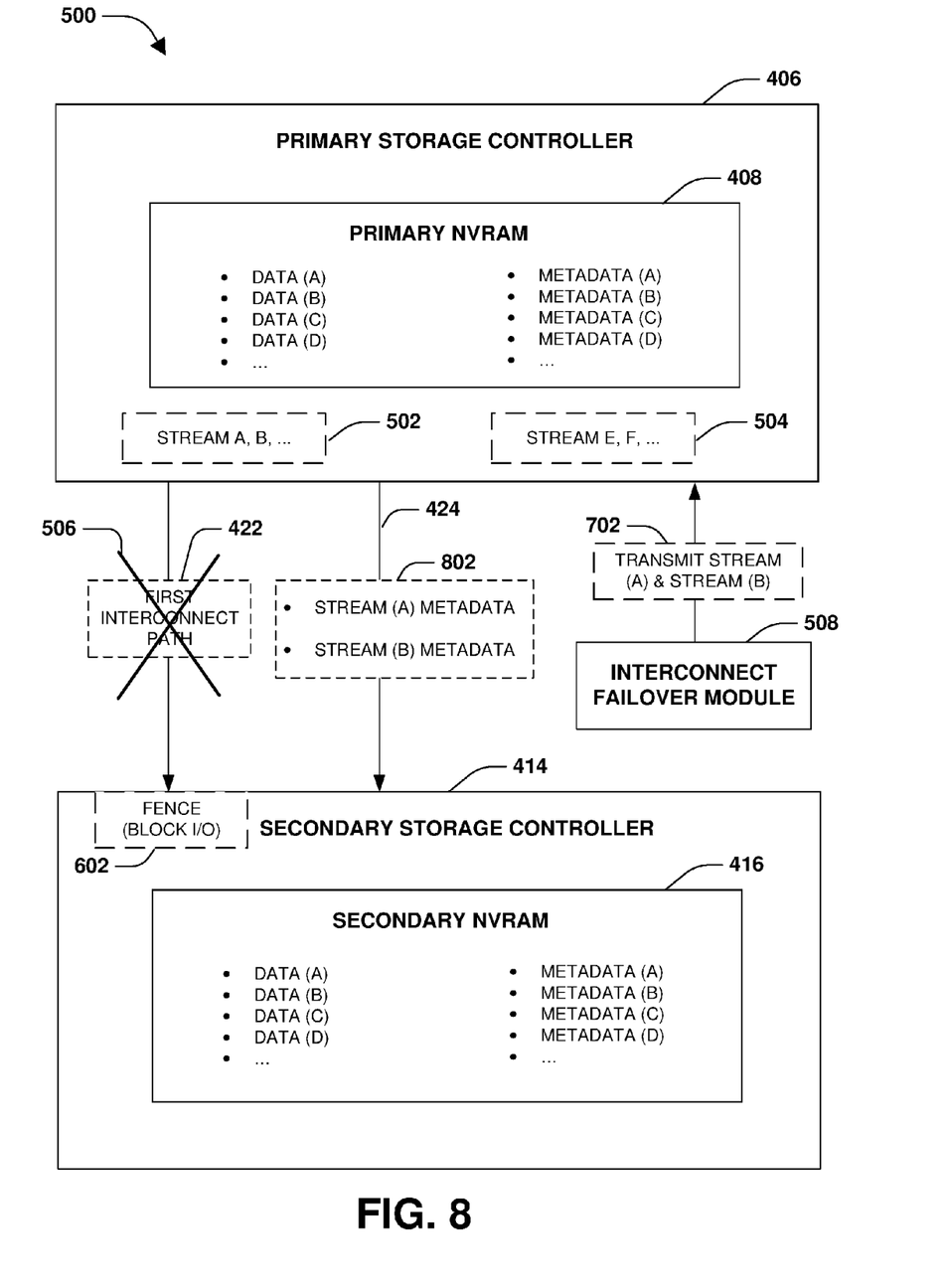
FIG. 8 is an example of an interconnect failover module facilitating transmission of metadata associated with one or more streams affected by a failover of an interconnect path.
Figure 9:
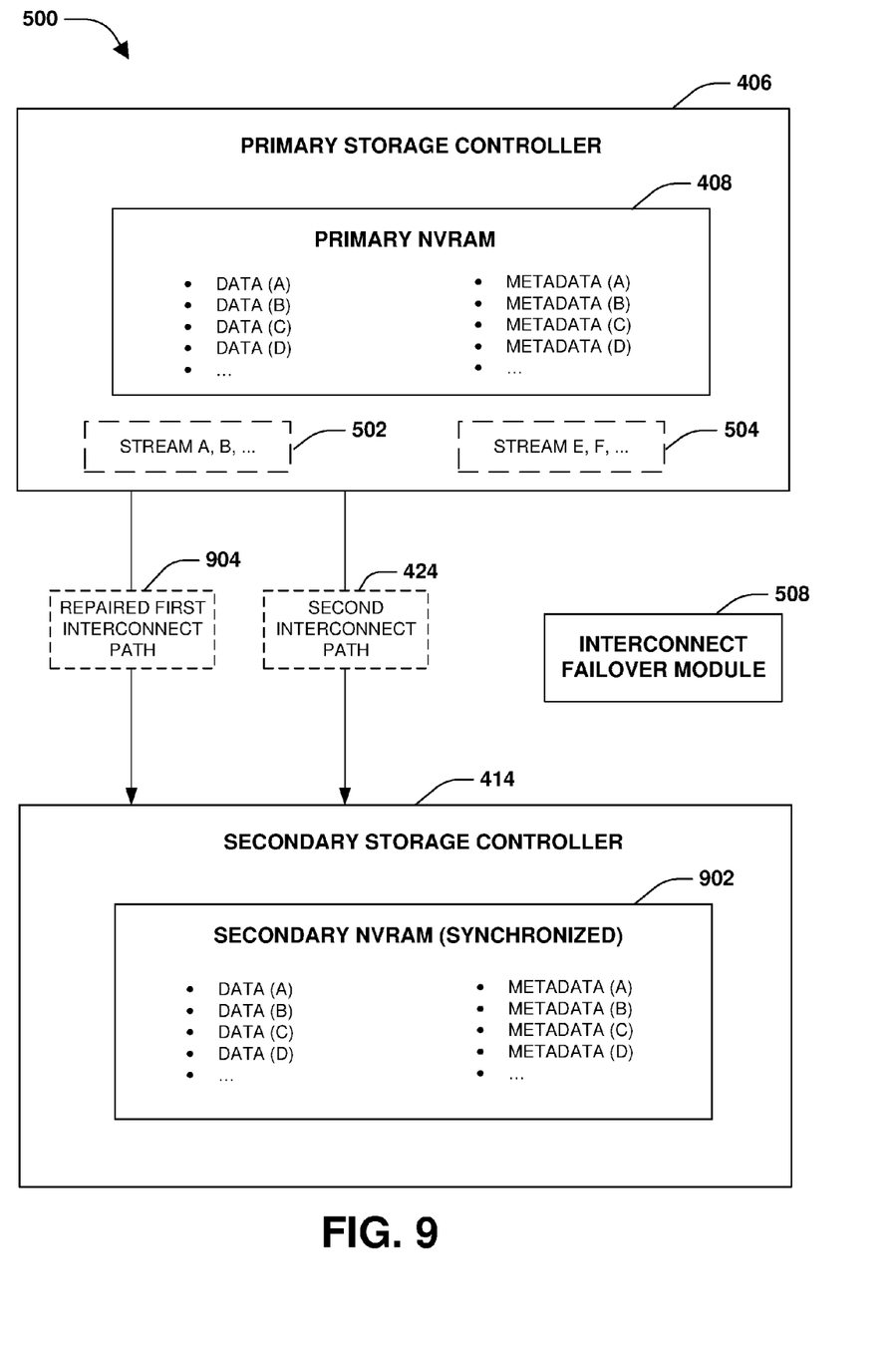
FIG. 9 is an example of a repaired interconnect path and a synchronized secondary NVram.

Accordingly, the interconnect failover module 508 may facilitate data transmission 704 of stream (A) data and/or stream (B) data over the second interconnect path 424 from the primary storage controller 406 to the secondary storage controller 414 (e.g., an RDMA transmission between the primary NVram 408 and the secondary NVram 416). In an example, the data is transmitted before transmission of metadata describing such data. For example, upon completion of the data transmission 704, the interconnect failover module 508 may facilitate a metadata transmission 802 of stream (A) metadata and steam (B) metadata over the second interconnect path 424 from the primary storage controller 406 to the secondary storage controller 414 (e.g., an RDMA transmission between the primary NVram 408 and the secondary NVram 416), as illustrated in FIG. 8. In this way, data and/or metadata may be synchronized from the primary NVram 408 to the secondary NVram 416, resulting in a synchronized secondary NVram 902 that is consistent with the primary NVram 408, as illustrated in FIG. 9. In an example, the interconnect failover of the first interconnect path 422 may repair the first interconnect path 422, resulting in a repaired first interconnect path 904. The secondary storage controller 414 may remove the fence 602 and accept I/O operations from the repaired first interconnect path 904.

Figure 10:
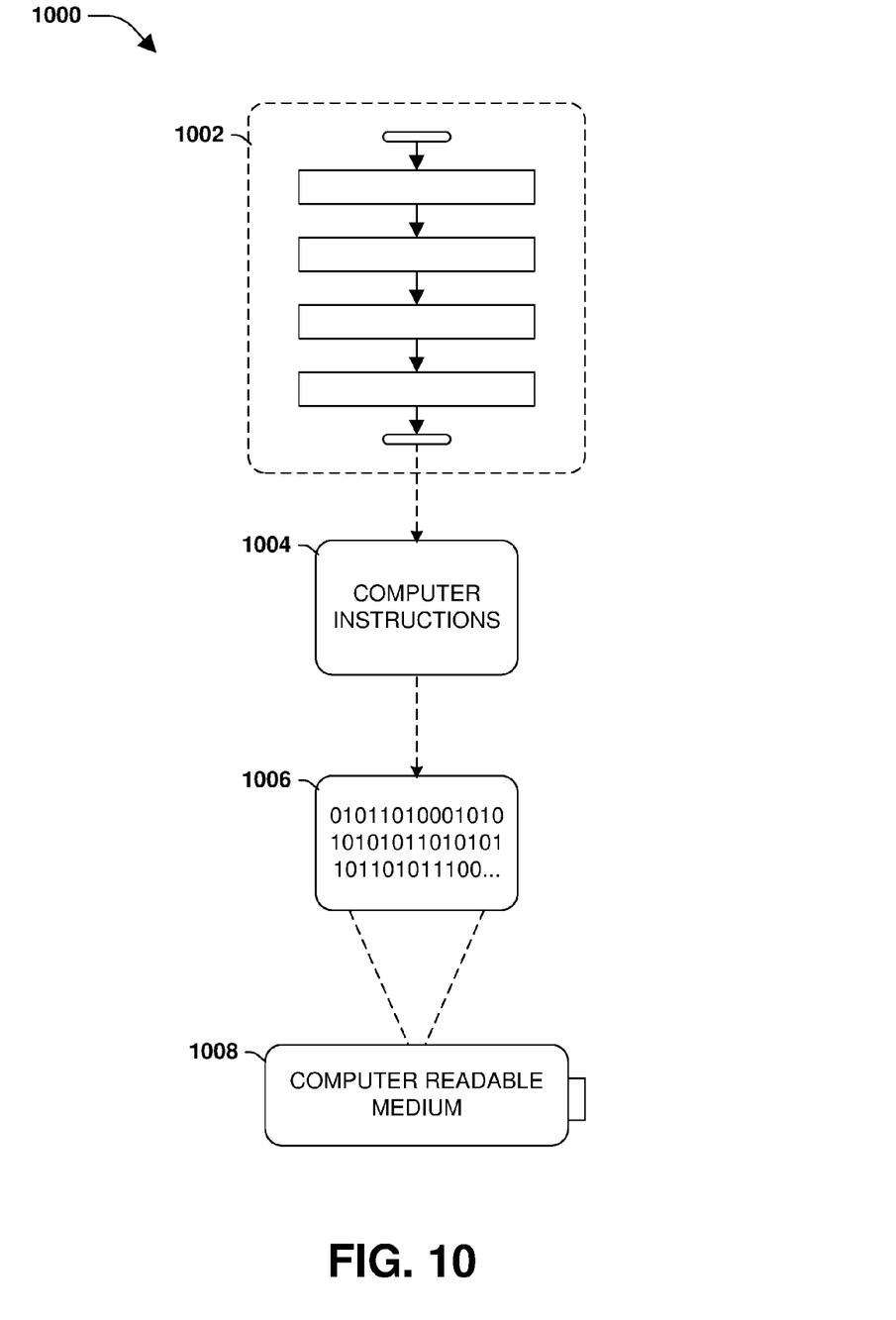
FIG. 10 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 10, wherein the implementation 1000 comprises a computer-readable medium 1008, such as a CD-R DVD-R, flash drive, a platter of a hard disk drive, etc., on which is encoded computer-readable data 1006. This computer-readable data 1006, such as binary data comprising at least one of a zero or a one, in turn comprises a set of computer instructions 1004 configured to operate according to one or more of the principles set forth herein. In some embodiments, the processor-executable computer instructions 1004 are configured to perform a method 1002, such as at least some of the exemplary method 300 of FIG. 3, for example. In some embodiments, the processor-executable instructions 1004 are configured to implement a system, such as at least some of the exemplary system 500 of FIG. 5, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying a failover trigger associated with a first interconnect path between a first storage controller and a second storage controller;
   sending a fence instruction to the second storage controller, the fence instruction instructing the second storage controller to fence I/O operations from the first interconnect path;
   receiving a fence acknowledgement message from the second storage controller; and
   performing interconnect failover for the first interconnect path utilizing a second interconnect path to transmit storage information from the first storage controller to the second storage controller, wherein the performing interconnect failover comprises:
     performing a data transmission to send data, associated with the storage information, over the second interconnect path; and
     performing a metadata transmission of metadata, describing the data, after the data transmission is complete, wherein the metadata transmission is restricted from being performed until completion of the data transmission.

2. The method of claim 1, wherein the first interconnect path is between a first nonvolatile memory of the first storage controller and a second nonvolatile memory of the second storage controller for data mirroring.

3. The method of claim 1, the identifying a failover trigger comprising:
   determining that a polling interval has expired; and
   polling the second storage controller to determine whether an I/O operation has completed.

4. The method of claim 1, the fence acknowledgement message indicating that the second storage controller will not accept I/O operations from the first interconnect path during interconnect failover for the first interconnect path.

5. The method of claim 1, the storage information comprising cached data stored by the first storage controller within a first nonvolatile memory and metadata describing the cached data.

6. The method of claim 1, the performing interconnect failover comprising:
   identifying a first stream corresponding to a first logical unit of the storage information based upon the first stream corresponding to first in-flight I/O associated with the first interconnect path; and
   facilitating transmission of the first stream to the second storage controller over the second interconnect path.

7. The method of claim 6, the facilitating transmission of the first stream comprising:
   facilitating a second data transmission of second data, associated with the first stream, over the second interconnect path.

8. The method of claim 7, comprising:
   determining that the second data transmission has completed; and
   facilitating a second metadata transmission of second metadata over the second interconnect path, the second metadata describing the second data.

9. The method of claim 7, the facilitating a second data transmission of second data comprising:
   identifying a complete set of data associated with the first stream; and
   performing a single transmission of the complete set of data as the second data transmission.

10. The method of claim 1, the storage information stored within a second nonvolatile memory of the second storage controller as a data mirror of a first nonvolatile memory of the first storage controller.

11. The method of claim 6, the performing interconnect failover comprising:
    identifying a second stream corresponding to a second logical unit of the storage information based upon the second stream corresponding to second in-flight I/O associated with the first interconnect path; and
    facilitating transmission of the second stream to the second storage controller over the second interconnect path.

12. The method of claim 6, the performing interconnect failover comprising:
    identifying a stream as an unaffected stream; and
    facilitating continued operation of the stream.

13. The method of claim 1, wherein the second interconnect path corresponds to a remote direct memory access stream.

14. A computing device, comprising:
    memory comprising machine executable code having stored thereon instructions for performing a method; and
    a processor coupled to the memory, the processor configured to execute the machine executable code to cause the processor to:
      identify a failover trigger associated with a first interconnect path between a first storage controller and a second storage controller;
      send a fence instruction to the second storage controller over a second interconnect path, the fence instruction instructing the second storage controller to fence I/O operations from the first interconnect path;
      receive a fence acknowledgement message from the second storage controller; and
      perform interconnect failover for the first interconnect path utilizing the second interconnect path to transmit storage information from the first storage controller to the second storage controller, wherein the performing interconnect failover comprises:

performing a data transmission to send data, associated with the storage information, over the second interconnect path; and performing a metadata transmission of metadata, describing the data, after the data transmission is complete, wherein the metadata transmission is restricted from being performed until completion of the data transmission.

15. The computing device of claim 14, wherein the machine executable code causes the processor to:
identify a first stream corresponding to a first logical unit of the storage information based upon the first stream corresponding to first in-flight I/O associated with the first interconnect path; and
facilitate transmission of the first stream to the second storage controller over the second interconnect path.

16. The computing device of claim 14, wherein the machine executable code causes the processor to:
facilitate a second data transmission of second data, associated with the first stream, over the second interconnect path.

17. The computing device of claim 16, wherein the machine executable code causes the processor to:
determine that the second data transmission has completed; and
facilitate a second metadata transmission of second metadata over the second interconnect path, the second metadata describing the second data.

18. The computing device of claim 14, wherein the machine executable code causes the processor to:
identify a stream as an unaffected stream; and
facilitate continued operation of the stream.

19. A non-transitory machine readable medium comprising instructions, for performing a method, which when executed by a machine, causes the machine to:
identify a failover trigger associated with a first interconnect path between a first storage controller and a second storage controller;
send a fence instruction to the second storage controller over a second interconnect path, the fence instruction instructing the second storage controller to fence I/O operations from the first interconnect path;
receive a fence acknowledgement message from the second storage controller; and
perform interconnect failover for the first interconnect path utilizing the second interconnect path to transmit storage information from the first storage controller to the second storage controller, wherein the performing interconnect failover comprises:
performing a data transmission to send data, associated with the storage information, over the second interconnect path; and
performing a metadata transmission of metadata, describing the data, after the data transmission is complete, wherein the metadata transmission is restricted from being performed until completion of the data transmission.

20. The non-transitory machine readable medium of claim 19, wherein the second interconnect path is provided between a data cache of a first non-volatile memory of the first storage controller and a second non-volatile memory of the second storage controller.

* * * * *